United States Patent
Makise et al.

[11] Patent Number: 6,149,848
[45] Date of Patent: Nov. 21, 2000

[54] METHODS FOR PREPARING CONDUCTIVE THERMOPLASTIC RESIN COMPOSITIONS AND ELECTRIC CONDUCTORS

[75] Inventors: Masayuki Makise; Michio Narita; Seiji Maeno; Hideo Komatsu, all of Tokyo, Japan

[73] Assignee: Lion Corporation, Tokyo, Japan

[21] Appl. No.: 09/095,141

[22] Filed: Jun. 10, 1998

Related U.S. Application Data

[63] Continuation of application No. 08/722,232, filed as application No. PCT/JP95/00194, Feb. 13, 1995, Pat. No. 5,876,647.

[30] Foreign Application Priority Data

Apr. 21, 1994 [JP] Japan .......................... 6-83207

[51] Int. Cl.⁷ .................................. C04B 35/00
[52] U.S. Cl. ................. 264/105; 264/319; 264/328.17
[58] Field of Search ................. 264/105, 328.17, 264/319

[56] References Cited

U.S. PATENT DOCUMENTS

| | | | |
|---|---|---|---|
| 4,350,652 | 9/1982 | Theysohn et al. ............ | 264/105 |
| 4,839,114 | 6/1989 | Delphin et al. ............ | 265/105 |
| 4,876,033 | 10/1989 | Dziurla et al. ............ | 252/511 |
| 4,971,726 | 11/1990 | Maeno et al. ............ | 252/511 |
| 5,288,801 | 2/1994 | Ishii et al. ............ | 525/92 |
| 5,373,046 | 12/1994 | Okamura et al. ............ | 524/413 |
| 5,643,502 | 7/1997 | Nahass et al. ............ | 252/511 |

FOREIGN PATENT DOCUMENTS

| | | |
|---|---|---|
| 58-112712 | 7/1983 | Japan . |
| 59-96142 | 6/1984 | Japan . |
| 62-297353 | 12/1987 | Japan . |
| 2-180958 | 7/1990 | Japan . |
| 2-202425 | 8/1990 | Japan . |
| 4-268362 | 9/1992 | Japan . |
| 5-65362 | 3/1993 | Japan . |
| 5-124088 | 5/1993 | Japan . |

OTHER PUBLICATIONS

Plastics, vol. 42, No. 3, pp. 73–79 (with English translation); Mar. 1991.
Plastics, vol. 42, No. 4, pp. 112–122 and 152 (with English translation); Apr. 1991.
Kobelco, KTX Technical Report, vol. 1 (with English translation). May 1993.
Martin H. Mack, "Split–Feed Compounding of Highly Filled Polymers," Aug. 1990, pp. 31–36 (Plastics Engineering, vol. XLVI, No. 8).

*Primary Examiner*—Christopher A. Fiorilla
*Attorney, Agent, or Firm*—Burns, Doane, Swecker & Mathis, LLP

[57] ABSTRACT

A method for preparing a conductive thermoplastic resin composition or an electric conductor includes the step of kneading (a) conductive resin master batch pellets of conductive carbon black and a thermoplastic resin in which the conductive carbon black accounts for 5 to 50% by weight relative to the total amount 100 parts by weight of the conductive carbon black and the thermoplastic resin, (b) a thermoplastic resin in a weight ratio: $(a+b)/(a)$ ranging from 1.01 to 1.5. This method permits the production of a conductive carbon black-containing conductive resin composition and an electric conductor which show stable conductivity even within a high resistance region (having a surface resistivity ranging from $10^6$ to $10^{16}$ $\Omega$), wherein the control of the conductivity is difficult.

6 Claims, 2 Drawing Sheets

METHODS FOR PREPARING CONDUCTIVE THERMOPLASTIC RESIN COMPOSITIONS AND ELECTRIC CONDUCTORS

This application is a continuation of application Ser. No. 08/722,232, filed Oct. 9, 1996 now U.S. Pat. No. 5,876,647, which application is a 371 of PCT/JP95/00194, filed Feb. 13, 1995.

TECHNICAL FIELD

The present invention relates to a method for preparing a thermoplastic resin composition which comprises a thermoplastic resin and specific carbon black and which shows only a small variation in the conductivity, without accompanying any scattering of carbon black, in a high productivity rate; a method for preparing a conductive carbon black-containing conductive resin composition which shows stable conductivity even in a high resistance region (having a surface resistivity ranging from $10^6$ to $10^{16}$ $\Omega$), wherein the control of the conductivity is difficult; and a method for preparing an electric conductor.

BACKGROUND OF THE INVENTION

The demand for thermoplastic resin products to which electric conductivity is imparted by incorporating carbon black into thermoplastic resins has recently been considerably increased in various fields, in particular, materials for electronic parts, computers and VTR, antistatic materials for household appliances and materials for electromagnetic shielding.

As methods for preparing such conductive thermoplastic resins, there have conventionally been used those in which a continuous twin-screw extruder is used. As methods for feeding ingredients to the extruder in the production method which makes use of such a continuous twin-screw extruder, there have in general been used a method in which carbon black and a resin are, in advance, blended in, for instance, a Henschel mixer or a tumbling mixer and then the resulting blend is fed to the extruder by a variety of feeders; and a method in which carbon black and a resin are separately and quantitatively fed to the extruder using counting feeders. If adopting either of these feeding methods, however, resins and carbon black differ from one another in true specific gravity, bulk density and shape and accordingly, they cause classification during blending or after being fed to the extruder to thus cause a difference in the concentration of carbon black in the composition. Therefore, the resulting resin cannot sometimes be practically used since these methods do not provide resins which do not have any variation in the conductivity and have stable conductivity.

The bulk density of carbon black used for imparting conductivity to resins is very low and accordingly the carbon black includes a large amount of air. Such a large amount of air is released when the carbon black is dispersed in resins using a twin-screw extruder and rises from the feed opening for the carbon black. The rise of the air leads to scattering of carbon black. As a result, there have been pointed out a variety of problems such that the scattering of carbon black leads to a difference in the carbon black concentration within the resin composition, that the scattering of carbon black also impairs the working environment, and that the suspended carbon black fine particles are adhered to the inner portions of precision machines to thus destroy the internal electronic parts thereof. The blowing up of carbon black is closely correlated to the feed rate thereof and accordingly, the feed rate should be reduced if carbon black causes scattering and this in turn results in a decrease of the productivity.

As a production method capable of being adopted when ingredients are fine particles, there has been proposed a production method in which an opening is positioned downstream of a feed opening for ingredients and the structure of the screw at the portion between the ingredient-feeding part and the opening is designed in such a manner that it does not compress the ingredients, but melts or kneads the same (Japanese Un-Examined Patent Publication (hereinafter referred to as "J.P. KOKAI") No. Sho 58-29644). However, this method does not permit the improvement of the blend of a resin and carbon black in case of the conductive carbon black used in the present invention.

Alternatively, there has also been proposed a method which makes use of a resin master batch having a high carbon black content for the purpose of, in particular, preventing any scattering of carbon black (J.P. KOKAI No. Sho 54-58747) and there has in general been adopted a method for imparting conductivity to a resin by kneading a desired resin with pellets of such a resin master batch having a high carbon black content. In this connection, a small amount of the master batch pellets is in general mixed with a thermoplastic resin and then the resulting mixture is kneaded and formed into conductive thermoplastic resin articles.

In such a method, however, it is relatively easy to impart, to a resin, stable conductivity within a low resistance region (the surface resistivity thereof falling within the range of from $10^2$ to $10^4$ $\Omega$), while it is quite difficult to control the conductivity of the resulting resin composition in a high resistance region (the surface resistivity thereof falling within the range of from $10^6$ to $10^{16}$ $\Omega$).

On the other hand, if the content of conductive carbon black present in a conductive master batch pellets is very close to that of conductive carbon black to be present in a desired conductive thermoplastic resin product, pellets having a conductive carbon black content identical to that in the intended conductive thermoplastic resin product have been produced, in one step, by the same method used for preparing the master batch in place of preparing the resin product by blending master batch pellets separately prepared with a small amount of thermoplastic resin and then conductive thermoplastic resin products have been directly prepared from the resulting pellets. In this method, however, it is likewise relatively easy to impart, to a resin, stable conductivity within a low resistance region (the surface resistivity thereof falling within the range of from $10^2$ to $10^4$ $\Omega$), while it is quite difficult to control the conductivity of the resulting resin composition in a high resistance region (the surface resistivity thereof falling within the range of from $10^6$ to $10^{16}$ $\Omega$).

DISCLOSURE OF THE INVENTION

An object of the present invention is to provide a method for preparing, in a high productivity rate, a conductive thermoplastic resin composition having a low variation of conductivity, without being accompanied by any scattering of carbon black.

Another object of the present invention is to provide a method for preparing a conductive carbon black-containing conductive resin composition showing stable conductivity even in the high resistance region (the surface resistivity thereof falling within the range of from $10^6$ to $10^{16}$ $\Omega$) wherein the control of the conductivity thereof has been difficult.

A still another object of the present invention is to provide a method for preparing an electric conductor possessing stable conductivity even in a high resistance region wherein the control of the conductivity is very difficult.

The aforementioned and other objects of the present invention will be more apparent from the following description and Examples.

The first embodiment of the present invention has been developed on the basis of such a finding that the foregoing object of the present invention can be achieved by providing a method which makes use of a specific amount of carbon black and a continuous twin-screw extruder whose screws rotate in the same direction.

More specifically, the present invention according to the first embodiment relates to a method for preparing a conductive carbon black-containing thermoplastic resin composition in which the conductive carbon black accounts for 5 to 50% by weight of the total amount of the conductive carbon black and the thermoplastic resin (100 parts by weight in all), wherein the thermoplastic resin is gelled by feeding it to a continuous twin-screw extruder whose screws rotate in the same direction (hereinafter referred to as "continuous unidirectionally rotating twin-screw extruder"), then the conductive carbon black is forced into a barrel of the continuous unidirectionally rotating twin-screw extruder, followed by degassing, at an ordinary pressure, through an opening for degassing formed within the twin-screw extruder prior to the complete dispersion of the conductive carbon black in the thermoplastic resin and continuing the kneading operation to thus obtain a kneaded product of the thermoplastic resin and the conductive carbon black through the die of the extruder.

The second embodiment of the present invention has been developed on the basis of such a finding that the foregoing object of the present invention can efficiently be accomplished by kneading resin master batch pellets having a high conductive carbon black content with a thermoplastic resin in a small amount on the order of 1 to 50% of the total weight of the pellets.

More specifically, the present invention according to the second embodiment relates to a method for preparing a conductive thermoplastic resin composition which comprises the step of kneading (a) conductive resin master batch pellets of conductive carbon black and a thermoplastic resin in which the conductive carbon black accounts for 5 to 50% by weight of the total amount of the conductive carbon black and the thermoplastic resin, i.e., 100 parts by weight, and (b) a thermoplastic resin in a weight ratio: (a+b)/(a) ranging from 1.01 to 1.5.

In the second embodiment of the present invention, there is also provided a method for preparing a conductive carbon black-containing electric conductor which comprises the steps of kneading (a) conductive resin master batch pellets of conductive carbon black and a thermoplastic resin in which the conductive carbon black accounts for 5 to 50% by weight of the total amount of the conductive carbon black and the thermoplastic resin, i.e., 100 parts by weight, and (b) a thermoplastic resin in a weight ratio: (a+b)/(a) ranging from 1.01 to 1.5 and then extrusion-molding the kneaded product.

BEST MODE FOR CARRYING OUT THE INVENTION

The thermoplastic resins used in the conductive resin master batch pellets according to the first and second embodiments of the present invention are those having strength and heat resistance which vary depending on the applications of the conductive resin composition or an electric conductor as the final product and a melt flow rate (MFR) of not less than 1 g/10 min, preferably 8 to 2000 g/10 min and particularly preferably 8 to 600 g/10 min. More specifically, examples thereof include polyethylene resins such as high, middle and low density polyethylene resins and linear low density polyethylene resins, polypropylene resins, poly(1,2-butadiene) resins, ethylene-butene copolymers, ethylene-vinyl acetate copolymers, copolymers of ethylene and methyl, ethyl, propyl or butyl acrylate or methacrylate, or chlorinated products thereof, or polyolefinic resins such as mixtures of at least two of the foregoing polymers; styrenic resins such as polystyrene resins, ABS resins and AS resins; polyester resins such as polyethylene terephthalate resins and polybutylene terephthalate resins; polyamide resins such as 6-nylon resin and 6,6-nylon resin; superengineering resins such as polysulfone resins, modified polysulfone resins, polyallysulfone resins, polyketone resins, polyetherimide resins, polyarylate resins, polyphenylene sulfide resins, liquid crystalline polymers, polyether sulfone resins, polyether etherketone resins, polyimide resins, polyamideimide resins and fluorocarbon resins; polyvinyl chloride resins, thermoplastic urethane resins, polyacetal resins, polycarbonate resins and modified polyphenylene ether resins. Among these polymers, preferred are polycarbonate resins, polyethylene terephthalate resins, polybutylene terephthalate resins, 6-nylon resin, 6,6-nylon resin, polystyrene resins, polyphenylene sulfide resins, thermoplastic urethane resins and modified polyphenylene ether resins, with polycarbonate resins, polyethylene terephthalate resins, polybutylene terephthalate resins, polystyrene resins, polyphenylene sulfide resins, thermoplastic urethane resins, modified polyphenylene ether resins and polyetherimide resins being particularly preferred.

In addition, the thermoplastic resin used for preparing the conductive carbon black master batch pellets (a) and the thermoplastic resin (b) for diluting carbon black (hereinafter also referred to as "diluent resin")may be the same or different.

Incidentally, the melt flow rate (MFR) herein used means the value determined according to the method specified by JIS for each specific resin, for instance, methods according to JIS K6758 (230° C., 2.16 Kgf) and JIS K6730 (190° C., 2.16 Kgf) for polypropylene resins, polyethylene resins, ethylene-vinyl acetate resins respectively and methods according to JIS K7210, Method A, Condition 4 (190° C., 2.16 Kgf) for other polyolefinic resins. Moreover, the values of resins which are not specified in Japanese Industrial Standards are determined at temperatures and under loads specified below using the apparatus disclosed Method A of in JIS K7210. The conditions for the determination thereof are listed in the following Table 1.

TABLE 1

Conditions for Determining Melt Flow Rate of Resins

| Resins | Standards | Temp. (° C.) | Load (Kgf) |
|---|---|---|---|
| polystyrene resin | JIS K6871 | 200 | 5.00 |
| styrenic resins other than polystyrene resin | JIS K6874 | 220 | 10.00 |
| polyester resins | — | 275 | 2.16 |
| 6-nylon resin | JIS K7210 | 230 | 2.16 |
| polyamide resins other than 6-nylon resin | JIS K7210 | 275 | 2.16 |
| polyetherimide resin | JIS K7210 | 343 | 6.70 |
| polyvinyl chloride resin | — | 190 | 10.00 |
| thermoplastic urethane resin | JIS K7311 | 230 | 10.00 |
| polyacetal resin | JIS K7210 | 190 | 2.16 |
| polycarbonate resin | JIS K7210 | 300 | 1.20 |
| modified polyphenylene ether resin | — | 250 | 10.00 |
| other resins | — | 230 | 10.00 |

The conductive carbon black components used in the present invention are those having a DBP oil absorption of not less than 200 ml/100 g and preferably 340 to 700 ml/100 g. Among these, preferred are those having a specific surface area ranging from 700 to 1500 m$^2$/g and more preferably 750 to 1300 m$^2$/g for the first embodiment of the present invention. In this connection, they preferably have a bulk density of not more than 160 g/l. Moreover, in the conductive carbon black-containing thermoplastic composition according to the first embodiment of the present invention and the conductive resin master batch pellets used in the second embodiment of the present invention, the conductive carbon black accounts for 5 to 50% by weight and preferably 5 to 20% by weight of the total amount of the conductive carbon black and the thermoplastic resin, i.e., 100 parts by weight.

The conductive carbon black-containing thermoplastic composition according to the first embodiment of the present invention and the conductive resin master batch pellets used in the second embodiment of the present invention comprise, as essential components, conductive carbon black and a thermoplastic resin, but they may further comprise graphite in addition to the foregoing essential components. In this respect, the graphite serves as a stabilizer for achieving stable conductivity in a high resistance region, preferably has an average particle size ranging from 3 to 15μ and is preferably added to the conductive carbon black-containing thermoplastic composition according to the first embodiment of the present invention and the conductive resin master batch pellets used in the second embodiment of the present invention in an amount ranging from 2 to 15% by weight. It is also possible to add, to the composition of the pellets, an anti-oxidant, a degradation-inhibitory agent, a UV absorber and/or a lubricant in an amount ranging from 0.1 to 1% by weight, insofar as these additives do not impair the quality of the resulting composition or pellets.

The conductive resin master batch pellets used in the second embodiment of the present invention may be those having any particle size, but preferred are those having a cylindrical shape having a diameter ranging from 2 to 4 mm and a length ranging from 3 to 5 mm. In addition, the thermoplastic resin used herein may likewise have any particle size, but preferred are those having a size approximately identical to that of the conductive resin master batch pellets.

In the production method according to the first embodiment of the present invention, an opening for introducing thermoplastic resins is suitably arranged at a position on the barrel, corresponding to 0 to 10% and preferably 0 to 7% of the length thereof (if the overall length of the barrel of the unidirectionally rotating twin-screw extruder is assumed to be 100) from the side of a motor. The resin may be introduced into the barrel by gravitational dropping through a hopper or may compulsorily be introduced thereinto, but it is preferably introduced to the barrel by gravitational dropping.

In the first embodiment of the present invention, the thermoplastic resin thus fed to the barrel is gelled by the kneading action of the screws fitted to the barrel and heat externally supplied to the barrel, and then conductive carbon black is compulsorily introduced into the barrel through at least one side feeder to thus disperse the conductive carbon black in the gelled resin. In this regard, any side feeder may be used insofar as the conductive carbon black can be compulsorily introduced into the barrel, but the conductive carbon black is preferably compulsorily introduced into the barrel by a method in which a screw is used. More specifically, there may be used TWIN FEEDER 251 available from Nakatani Machinery Co., Ltd. Moreover, the side feeder is arranged at a position of the barrel at which the resin is gelled. In general, the side feeder is preferably arranged at a position on the barrel, corresponding to 29 to 50% and preferably 33 to 50% of the length thereof (if the overall length of the barrel of the extruder is assumed to be 100) from the side of a motor. This is because if the side feeder is arranged at a position at which the resin is not gelatinized, the carbon black introduced by the side feeder is scattered through the opening for introducing the resin or an opening for degassing. This leads to a decrease in the productivity rate and does not lead to the formation of a conductive thermoplastic resin having stable conductivity. If an inlet port for introduction is arranged at the same position in place of the feeder and a counting feeder is used to thus introduce carbon black through the upper portion of the inlet port by gravitational dropping, the carbon black is also scattered through the inlet port for introduction. This likewise results in a decrease in the productivity rate and does not lead to the formation of a conductive thermoplastic resin having stable conductivity.

In the first embodiment of the present invention, the mixture is degassed under ordinary pressure prior to the complete dispersion of the conductive carbon black in the thermoplastic resin by, for instance, arranging at least one opening for degassing at a position on the barrel 17% upstream to 23% downstream, preferably 13% upstream to 17% downstream from the position at which the side feeder is fitted. In this connection, if an opening for degassing is formed at the position identical to that at which the side feeder is arranged, it is preferred to arrange them along the circumferential direction at an angle of at least 45°. In particular, the opening for degassing is preferably positioned at the top (upper portion) of the barrel. The size thereof varies depending on the size of the extruder, but it is in general desirable that the size thereof ranges from 1 cm$^2$ to 80 cm$^2$ and preferably 1 to 16 cm$^2$. If the carbon black is introduced into the barrel without installing any opening for degassing, the air included in the carbon black is released through the side feeder. This makes the introduction of carbon black difficult and this accordingly leads to a reduction in the productivity rate.

Any known screw may be used as those for the unidirectionally rotating twin-screw extruder used in the first embodiment of the present invention. The screw in general has a diameter ranging from 20 to 150 mm and a length ranging from 20 to 50 times the diameter. Moreover, the body and motor of the extruder used herein are known ones selected while taking into consideration the size of the screw used.

The screw parts for the extruder may likewise be selected from known ones and more specifically may be elements, and right-type (R-KD), left-type (L-KD) and neutral-type (N-KD) kneading disks such as those disclosed in PURA-SCHIKKU SEIKEI KAKO GAKKAISHI (Bulletin of Plastic Fabrication Society: "SEIKEI KAKO (Molding and Processing)", 1991,3, No. 6, pp. 431–403 and these parts may be used by arranging them in an appropriate order determined depending on the characteristic properties of the resin used and the amount of carbon black to be incorporated into the resin. In particular, it is preferred to arrange a neutral-type kneading disk which does not have any conveying and backward feeding ability and simply serves as a kneader and/or a right-type kneading disk which has both conveying and kneading abilities at the positions where a side feeder is disposed. This is because such arrangement permits the elimination of any scattering of carbon black and also permits the improvement in the productivity rate.

Although the thermoplastic resin is introduced into the extruder through the inlet for introducing the resin which is arranged at the position specified above using a known feeder in the first embodiment of the present invention, it is preferred to use a weight counting feeder having a determination precision within ±1% in order to prepare a conductive thermoplastic resin composition possessing stable conductivity. Moreover, in the first embodiment of the present invention, the carbon black is forced into the extruder through a side feeder after the resin is gelled. In order to obtain a conductive thermoplastic resin composition having stable conductivity, the screw of the side feeder is preferably rotated in advance so that the resin can be introduced into the extruder at a rate higher than that for introducing the carbon, carbon black is dropped on the screw of the side feeder using a weight counting feeder having a determination precision within ±1% and then the carbon black is compulsorily fed to the extruder through the side feeder. Interlocking type feeders wherein the amount introduced through one feeder varies in proportion to the change in the amount introduced through the other feeder are particularly preferably used as the weight counting feeders used for the introduction of the resin and the carbon black because of more stable conductivity of the resulting conductive thermoplastic resin.

The temperature of the barrel fitted to the unidirectional twin-screw extruder used in the first embodiment of the present invention is determined by the gelation temperature of the thermoplastic resin used and is set at a level 30 to 150° C. higher than the gelation temperature of the resin. Moreover, to obtain a resin composition having stable conductivity, the temperature of the area extending from 10% upstream of the position on the barrel at which the side feeder is placed to the position thereon at which the opening for degassing is formed is desirably set at a level of 60 to 150° C., preferably 70 to 150° C. higher than the gelation temperature of the resin used, and the temperature of the area on the barrel downstream of the the position thereon at which the opening for degassing is formed is desirably set at a level of 30 to 70° C., preferably 30 to 60° C. higher than the gelation temperature of the resin used. In addition, the rotational number of the screw may be controlled to a level on the order of, for instance, 100 to 300 rpm.

According to the first embodiment of the present invention, the degassing is carried out at ordinary pressure, then the kneading operation is continued to thus obtain, through the die, a kneaded product of a thermoplastic resin and conductive carbon black in any form such as a sheet-like, pellet-like or wire-like shape.

In the second embodiment of the present invention, the total weight of the conductive carbon black-containing resin master batch pellets as the component (a) and the thermoplastic resin as the component (b) when kneading these components (a) and (b) should range from 1.01 to 1.5 time, preferably 1.05 to 1.5 time, more preferably 1.05 to 1.3 time and most preferably 1.1 to 1.3 time the weight of the component (a), i.e., the master batch. This is because if the total weight thereof exceeds 1.5 time the weight of the component (a), the surface resistivity value of the resulting conductive resin composition or the electric conductor as the final product abruptly increases.

The conductive carbon black-containing resin master batch pellets used in the second embodiment of the present invention may be those prepared by any method, but it is preferred to use those prepared according to the first embodiment of the present invention.

It is preferred to uniformly blend the conductive master batch pellets, the diluent resin or the like before kneading these conductive master batch pellets, the diluent resin or the like in order to prepare the electric conductor according to the second embodiment of the present invention. The blending may easily be carried out according to any known method which comprises, for instance, dry-blending the master batch pellets, the diluent resin or the like in a mixer such as a Henschel mixer or a tumbler. The resulting uniform blend is subsequently kneaded, but may directly be kneaded using a counting feeder without carrying out uniform mixing. The kneading is carried out at a temperature of not less than the melting point of the resin in a kneading device such as a Banbury mixer or a twin-screw extruder (the conditions for kneading vary depending on the kind of the resin used, but the kneading is in general carried out at a temperature ranging from 150 to 380° C. for 5 to 30 minutes when a mixer is used as a kneading device or for 20 seconds to one minute when an extruder is used as a kneading device), followed by cooling and then forming the resulting kneaded product into an appropriate shape such as a pellet-like, powdery or massive shape. The resulting pellets or the like may be molded into a desired shape selected depending on the applications such as a sheet, a film, a plate or other special shapes by any known extrusion molding method such as an injection molding method, a blow molding method or an inflation molding method.

If using a molding machine having both kneading and extrusion functions such as a twin-screw extrusion-molding machine in the second embodiment of the present invention, the kneading and extrusion-molding (including injection molding) operations can be performed by one step by feeding the mixture of the conductive master batch pellets, the diluent resin or the like through a hopper.

Among the production methods described above, the second embodiment of the present invention preferably comprises preparing conductive resin master batch pellets (a) using a twin-screw extruder, and then kneading a mixture of the conductive resin master batch pellets (a) and a thermoplastic resin (b) (after uniformly mixing them or directly without uniformly mixing them) using a twin-screw extruder to form conductive resin pellets (preferably having a cylindrical shape whose diameter ranges from 2 to 4 mm and whose length ranges from 3 to 5 mm) as an example of the conductive thermoplastic resin composition. In this connection, it is preferred to divide the cylinder of the twin-screw extruder used for kneading the mixture comprising the conductive resin master batch pellets (a) and the thermoplastic resin (b) into a melting zone, a kneading zone and a die zone and to control the temperature of the melting and die zones to high levels (approximately the same level), while reducing the temperature of the kneading zone to a level of not less than 10° C., preferably 20 to 50° C. lower than that of the melting and die zones. The temperature of the melting and die zones is set at a level of 30 to 100° C., preferably 60 to 100° C. higher than the gelation temperature of the resin used. In addition, the rotational number of the screw during the kneading operation is preferably controlled to the range of from 100 to 300 rpm.

Moreover, in order to improve the heat resistance, dimensional stability, rigidity and mechanical strength of the conductive thermoplastic resin composition and the electric conductor produced according to the present invention, there may be incorporated, into the composition or conductor, inorganic fillers such as graphite, mica, glass fibers, silica, talc, calcium carbonate, zinc oxide, barium sulfate, stainless steel, copper oxide, nickel, nickel oxide and silicate-zirconia. Among these, preferred are glass fibers (length: 1.5 to 6 mm; diameter: 5 to $20\mu$). These inorganic fillers are desirably used in an amount ranging from 5 to 300 parts by weight and preferably 7 to 50 parts by weight per 100 parts by weight of the total amount of the foregoing thermoplastic resin and the conductive carbon black. Moreover, it is also possible to use an auxiliary agent for molding, for instance, an anti-oxidant such as known phenolic and phosphorus atom-containing type one, a lubricant such as a metal soap, a fatty acid amide derivative, and/or a known flame retarder or a plasticizer selected depending on the applications, in order to prevent any deterioration of the thermoplastic resin and the conductive carbon black during the kneading operation and to improve the molding properties of the resulting mixture thereof. The foregoing additives such as auxiliary agents for molding, flame retarders and plasticizers may be incorporated into the master batch in advance or may be added during kneading of the master batch and the diluent resin.

According to the production methods of the present invention, there are provided a variety of conductive thermoplastic resin compositions such as conductive resin pellets and conductive carbon black-containing electric conductors having stable conductivity, in particular, in a high resistance region. In addition, the method of the present invention permits the prevention of any scattering of carbon particles during the production of the conductive thermoplastic resin composition and the electric conductor and hence the prevention of any damage or pollution of the working environment caused by the scattered carbon, and in turn permits the production of electric conductors having excellent conductivity and also excellent in resin strength.

The electric conductor prepared according to the present invention has conductivity ranging from $10^3$ to $10^{16}$ Ω as expressed in terms of the surface resistivity thereof and possesses stable conductivity, in particular, in the high resistance region on the order of $10^6$ to $10^{16}$ Ω. Therefore, the electric conductor prepared by the method of the present invention can widely be used in various fields such as electronic machinery and tools, packaging materials for IC and the like, trays and carriers.

Then the present invention will hereinafter be described in more detail with reference to the following Examples, but the present invention is by no means limited to these specific Examples. In the following Examples, all of the compositions are expressed in terms of "% by weight".

EXAMPLE 1

To each of 4 kinds of continuous unidirectionally rotating twin-screw extruders (screw diameter: 57 mm; L/D: 36; NR-II 57 mm unidirectionally rotating twin-screw vent type extruder available from Nakatani Machinery Co., Ltd.) which are schematically shown in FIG. 1 (A) to (D), there were added 90 parts by weight of a polycarbonate resin (Taflon A-2200 available from Idemitsu Petrochemical Co., Ltd.) and 10 parts by weight of carbon black having a bulk density of 140 g/l and a DPB oil absorption of 370 ml/100 g (specific surface area: 810 m²/g) according to the introduction methods specified in the following Table 2, followed by kneading them at a screw rotational number of 220 rpm to give a conductive resin composition.

Figure 1:
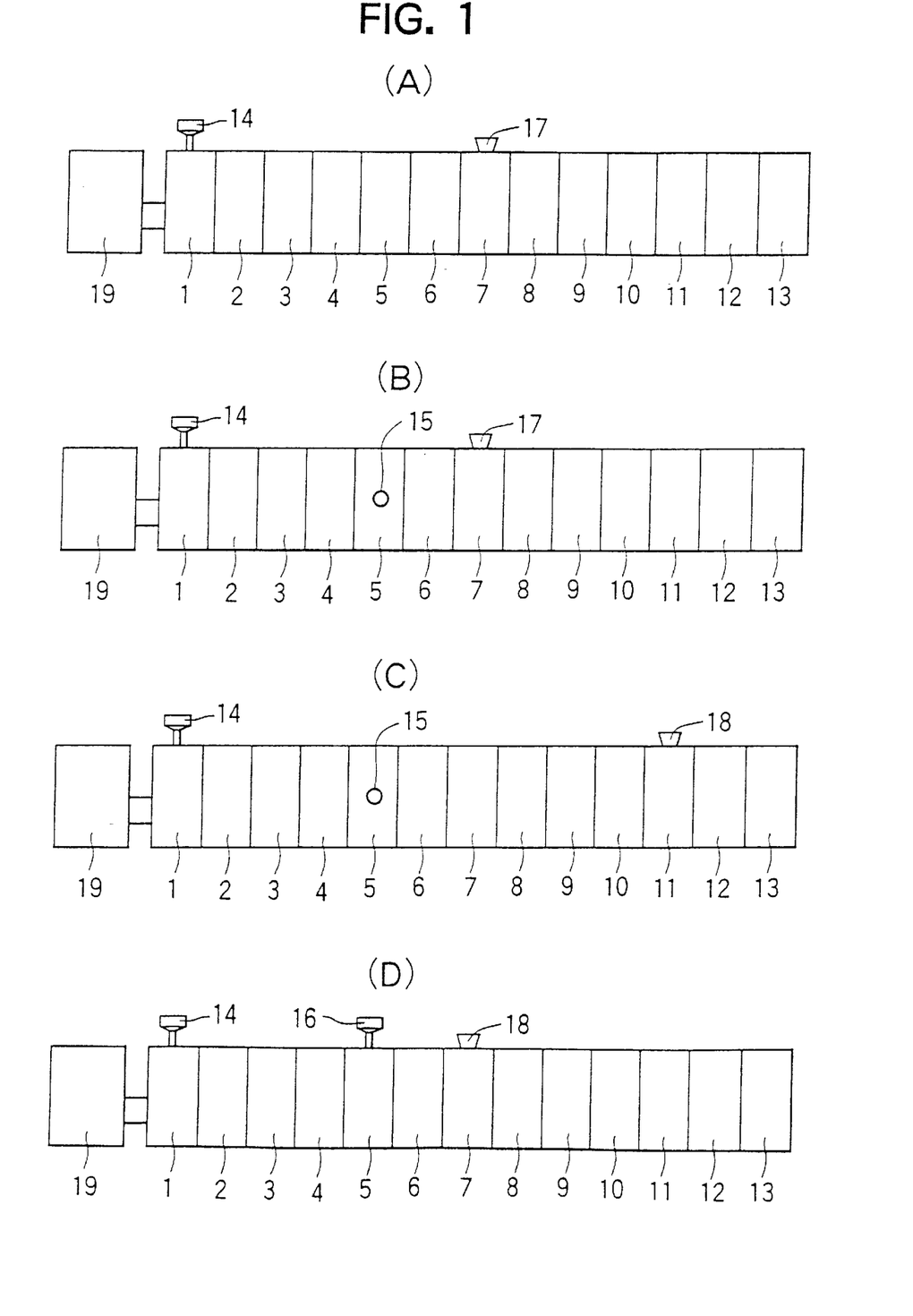
FIG. 1A is a diagram schematically showing the continuous unidirectional rotating twin-screw extruder which may be used for carrying out charging method A.
FIG. 1B is a diagram schematically showing the continuous unidirectional rotating twin-screw extruder which may be used for carrying out charging method B.
FIG. 1C is a diagram schematically showing the continuous unidirectional rotating twin-screw extruder which may be used for carrying out charging method C.
FIG. 1D is a diagram schematically showing the continuous unidirectional rotating twin-screw extruder which may be used for carrying out charging method D.

In FIG. 1, reference numerals 1 to 12 represent barrel zones, 13 a die, 14 an opening for resin-introduction, 15 a closed side feeder, 16 an opening for carbon black-introduction, 17 an opening for degassing (square shape having a size of 4 cm×4 cm), 18 an opening for degassing (square shape having a size of 4 cm×4 cm) and 19 a motor. Incidentally, the length of each barrel zone 1 to 12 is equal to 1/12 of the whole length of the barrel which is assumed to be 100.

The screw is designed in such a manner that it serves to melt, knead and convey ingredients without compression thereof within the barrel zones 1 to 5, it serves to knead, compress and convey the ingredients within the barrel zones 6 and 8 and it serves to compress and convey the same within the remaining zones.

The resins and the carbon black were charged into the extruder according to the following methods.

Charging Method A

As shown in FIG. 1 (A), a mixture of the resin and the carbon black was charged, by gravitational dropping, into the twin-screw extruder through an opening for introduction arranged at a position 14 using a counting feeder (Arculate Model 602 available from Kuma Engineering Co., Ltd.). The opening for degassing is formed at a position 17.

Charging Method B

As shown in FIG. 1 (B), the resin was charged, by gravitational dropping, into the twin-screw extruder through an opening for introduction arranged at a position 14 using a counting feeder (Arculate Model 602 available from Kuma Engineering Co., Ltd.) and the carbon black was added through gravitational dropping onto the screw using a counting feeder (Arculate Model 602 available from Kuma Engineering Co., Ltd.) while rotating the screw of a side feeder (TWIN FEEDER 251 available from Nakatani Machinery Co., Ltd.) arranged at a position 15 as shown in FIG. 1 (B) so that the resin could be charged into the extruder at a speed higher than the charging speed of the carbon black, to thus force the carbon black into the twin-screw extruder by the action of the side feeder. The opening for degassing is formed at a position 17.

Charging Method C

As shown in FIG. 1 (C), the resin was charged, by gravitational dropping, into the twin-screw extruder through an opening for injection arranged at a position 14 using a counting feeder (Arculate Model 602 available from Kuma Engineering Co., Ltd.) and the carbon black was added, through gravitational dropping, onto the screw using a counting feeder (Arculate Model 602 available from Kuma Engineering Co., Ltd.) while rotating the screw of a side feeder (TWIN FEEDER 251 available from Nakatani Machinery Co., Ltd.) arranged at a position 15 as shown in FIG. 1 (C) so that the resin could be charged into the extruder at a speed higher than the charging speed of the carbon black, to thus force the carbon black into the twin-screw extruder by the action of the side feeder. The opening for degassing is formed at a position 18.

Charging Method D

As shown in FIG. 1 (D), the resin was charged, by gravitational dropping, into the twin-screw extruder through an opening for injection arranged at a position 14 using a counting feeder (Arculate Model 602 available from Kuma Engineering Co., Ltd.) and the carbon black was fed, by gravitational dropping, to the twin-screw extruder using a counting feeder (Arculate Model 602 available from Kuma Engineering Co., Ltd.) through an opening for charging arranged at a position 16 as shown in FIG. 1 (D). The opening for degassing is formed at a position 18.

The temperature conditions used for the twin-screw extruder were as follows:

Temp. Cond. 1: barrel zone 1: cooling; barrel zones 2 to 6: 320° C.; barrel zones 7 to 12: 280° C. ; die: 280° C.

Temp. Cond. 2: barrel zone 1: cooling; barrel zones 2 to 6: 320° C.; barrel zones 7 to 12: 320° C.; die: 280° C.

Temp. Cond. 3: barrel zone 1: cooling; barrel zones 2 to 6: 240° C.; barrel zones 7 to 12: 280° C.; die: 280° C.

The screw parts in the barrel zone 5 wherein the side feeder was arranged were as follows:

4N: 4N Type Kneading Disk available from Nakatani Machinery Co., Ltd.

41: 41 Type Screw Element available from Nakatani Machinery Co., Ltd.

3N: 3N Type Kneading Disk available from Nakatani Machinery Co., Ltd.

31: 3R Type Kneading Disk available from Nakatani Machinery Co., Ltd.

There are listed in the following Table 2 the methods for charge of the thermoplastic resin and carbon black; the kinds of the screw parts at the same position where the side feeder is arranged; the established temperature conditions for each barrel; the gelatinized condition of the resin at the position 5 shown in FIG. 1; the maximum discharge rate when carbon black is free of any scattering; the scattered condition of carbon black when the discharge rate is fixed to 80 kg/hr; and the volume resistivity values of the resulting conductive resin compositions.

In Table 2, the gelled state of the resin was evaluated as follows:

○: the resin is gelled at the position 5 shown in FIG. 1;

X: the resin is not gelled at that position.

The scattering condition of carbon black was likewise evaluated on the basis of the following criteria:

○: carbon black does not cause any scattering;

X: carbon black undergoes severe scattering.

In addition, the volume resistivity value was evaluated by press-molding each resulting thermoplastic resin composition into a specimen (5 samples each) having a size of 10 cm×10 cm×0.2 cm and determining the volume resistivity of these specimen according to the measuring method specified in SRIS-2301. The maximum and minimum values thereof observed for each composition are listed in Table 2.

TABLE 2

| No. | 1 | 2 | 3 | 4 | 5 | 6* | 7* | 8* | 9* |
|---|---|---|---|---|---|---|---|---|---|
| Methods for Charging Resin and Carbon Black | B | B | B | B | B | D | A | C | B |
| Screw Parts (Position 5) | 4N | 41 | 4N | 3R | 3N | 41 | 41 | 41 | 41 |
| Temp. Cond. for Each Barrel | 1 | 1 | 2 | 2 | 2 | 1 | 1 | 1 | 3 |
| Gelatinized Condition of Resin (at Position 15) | ○ | ○ | ○ | ○ | ○ | ○ | ○ | ○ | x |
| Max. Discharge Rate (kg/hr) | 120 | 110 | 110 | 120 | 120 | 55 | 30 | 30 | 35 |
| Scatter of Carbon Black | ○ | ○ | ○ | ○ | ○ | x | x | x | x |
| Volume Resistivity: Max. (Ω · cm) Min. | 52 42 | 64 44 | 63 45 | 53 43 | 54 42 | 250 54 | 1500 50 | 3300 57 | 2300 58 |

In Table 2, 6* to 9* represent Comparative Examples. The maximum discharge rate (kg/hr) herein means the value observed when the carbon black was free of any scattering and the scatter of carbon black means the scattered condition of carbon black observed when the discharge rate was fixed to 80 kg/hr.

As seen from the data listed in Table 2, the method of the present invention does not cause any scattering of carbon black and can ensure a discharge rate ranging from 110 to 120 kg/hr and a good productivity rate. In addition, the data indicate that the conductive thermoplastic resin composition prepared by the method does not show any variation in the volume resistivity and accordingly, shows stable conductivity. On the other hand, in Test No. 6 (carbon black was charged, by gravitational dropping, into the extruder through an opening arranged at the same position on the barrel where the side feeder was fitted, instead of charging the same through the side feeder), No. 7 (carbon black was charged into the extruder through the same opening through which the resin was charged, by the gravitational action), No. 8 (in the method for charging, any opening for degassing was not present at the position 17) and No. 9 (the resin was not gelled at the position on the barrel at which carbon black was charged through the side feeder) as Comparative Examples, carbon black undergoes vigorous scattering when the discharge rate is fixed to 80 kg/hr. For this reason, the discharge rate should be reduced to ½ to ⅓ time that used in the method of the present invention to thus prevent the scattering of carbon black and accordingly, the productivity rate is reduced.

Moreover, the conductive thermoplastic resin composition prepared by reducing the productivity rate still shows a severe variation in the conductivity on the order of 4 to 55 times (maximum value of the volume resistivity/minimum value thereof) and is not practicable.

EXAMPLE 2

Figure 2:
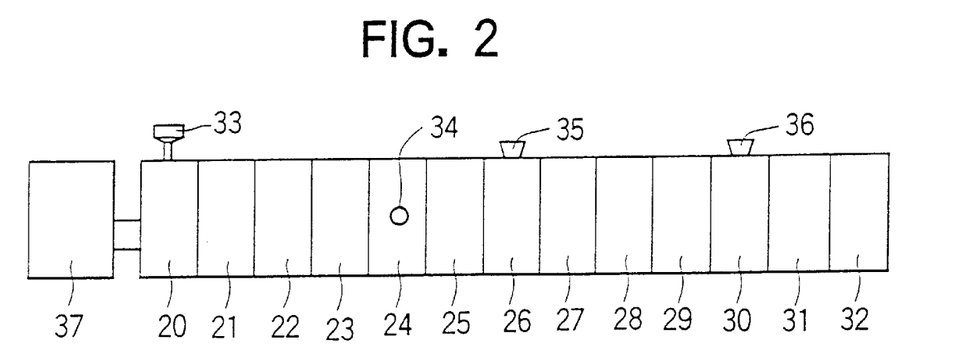
FIG. 2 is a diagram schematically showing the continuous unidirectional rotating twin-screw extruder which may be used for carrying out the charging method of Example 2.

Using a continuous unidirectionally rotating twin-screw extruder (screw diameter: 57 mm; L/D: 36; NR-II 57 mm Unidirectionally Rotating Twin-Screw Vent Type Extruder available from Nakatani Machinery Co., Ltd.) which was equipped with an opening for resin-charging, an opening for degassing and a forced side feeder, as shown in FIG. 2, a desired amount of a thermoplastic resin was charged to the extruder through the resin-charging opening arranged at a position 33 in the same manner used in Example 1 and a desired amount of carbon black was forced into the extruder through the side feeder positioned at 34 and the extruder was operated at a screw rotational number of 220 rpm to give a conductive resin composition. Incidentally, the opening for glass fiber charging arranged at a position 36 shown in FIG. 2 was closed when the composition was free of glass fibers.

The screw used was designed in such a manner that it serves to melt, knead and convey ingredients without compression thereof within the barrel zones 20 to 24, it serves to knead, compress and convey the ingredients within the barrel zones 25 and 27 and it serves to compress and convey the same within the remaining zones. Incidentally, the length of each barrel zone 20 to 31 is equal to 1/12 of the whole length of the barrel which is assumed to be 100.

There are summarized, in the following Table 3, the composition used in each experiment; the kinds of the screw parts at the same position where the side feeder is arranged; the established temperature conditions for each barrel zone; the gelatinized condition of the resin at the position 34 shown in FIG. 2; the maximum discharge rate when carbon black is free of any scattering; and the volume resistivity values of the resulting conductive resin compositions.

Incidentally, the gelatinized condition of the resin and the volume resistivity were evaluated according to the same methods used in Example 1.

The kinds of the thermoplastic resins, carbon black products and glass fibers used in Example 2 and the established temperature of the barrel of the twin-screw extruder are as follows:

Thermoplastic Resins Used polypropylene resin (PP): Idemitsu Polypro J-750H (available from Idemitsu Petrochemical Co., Ltd.)
polybutylene terephthalate resin (PBT): Toray PBT1401X04 (available from Toray Industries, Inc.)
modified polyphenylene ether resin (M-PPE): Noryl 115 (available from Nippon GE Plastics Co., Ltd.)
polyetherimide resin (PEI): Ultem 1010 (available from Nippon GE Plastics Co., Ltd.)
polyethylene terephthalate resin (PET): Biropet EMC307X04 (available from Toyobo Co., Ltd.)
glass fiber: CS03MA416 (available from Asahi Fiber Glass Co., Ltd.)
Carbon Black A: carbon black having a bulk density of 140 g/l and specific surface area of 810 $m^2/g$ (DBP oil absorption: 370 ml/100 g)
Carbon Black B: carbon black having a bulk density of 125 g/l and specific surface area of 1240 $m^2/g$ (DBP oil absorption: 480 ml/100 g)
Carbon Black C: carbon black having a bulk density of 250 g/l and specific surface area of 70 $m^2/g$ (DBP oil absorption: 210 ml/100 g)
Temp. Cond. 4: barrel zone 20: cooling: barrel zones 21 to 26: 280° C. barrel zones 27 to 31: 240° C.; die: 240° C.
Temp. Cond. 5: barrel zone 20: cooling: barrel zones 21 to 26: 320° C. barrel zones 27 to 31: 280° C.; die: 280° C.
Temp. Cond. 6: barrel zone 1: cooling: barrel zones 2 to 6: 380° C. barrel zones 7 to 12: 370° C.; die: 370° C.

TABLE 3

| Ex. No. | 10 | 11 | 12 | 13 | 14 | 15 | 16* | 17* | 18* |
|---|---|---|---|---|---|---|---|---|---|
| Composition (part by weight) | | | | | | | | | |
| PP | 95 | 0 | 0 | 0 | 0 | 75 | 0 | 0 | 0 |
| PBT | 0 | 90 | 0 | 0 | 0 | 0 | 98 | 0 | 0 |
| M-PPE | 0 | 0 | 0 | 85 | 0 | 0 | 0 | 70 | 75 |
| PEI | 0 | 0 | 0 | 0 | 93 | 0 | 0 | 0 | 0 |
| PET | 0 | 0 | 88 | 0 | 0 | 0 | 0 | 0 | 0 |
| glass fibers | 0 | 0 | 0 | 30 | 10 | 0 | 0 | 0 | 0 |
| Carbon Black A | 0 | 10 | 0 | 15 | 7 | 25 | 2 | 0 | 0 |
| Carbon Black B | 5 | 0 | 12 | 0 | 0 | 0 | 0 | 30 | 0 |
| Carbon Black C | 0 | 0 | 0 | 0 | 0 | 0 | 0 | 0 | 25 |
| Screw Parts *1 | 4N | 4N | 4N | 4N | 4N | 4N | 4N | 4N | 4N |
| Gelatinized Cond. of Resin (Position 24) | ○ | ○ | ○ | ○ | ○ | ○ | ○ | ○ | ○ |
| Established Temp. Cond. at Each Zone | 4 | 5 | 5 | 5 | 6 | 4 | 5 | 5 | 5 |
| Max. Discharge Rate (kg/hr) | 120 | 130 | 110 | 110 | 130 | 110 | 160 | —* | 90 |
| Volume Resistivity (Ω · cm) | | | | | | | | | |
| Max. | 54 | 78 | 3.2 | 84 | 82 | 1.2 | ** | —* | $5.4 \times 10^{10}$ |
| Min. | 39 | 59 | 2.8 | 69 | 71 | 1.1 | ** | —* | $3.2 \times 10^{8}$ |

Ex. Nos. 16* to 18* are Comparative Examples. The maximum discharge rate (kg/hr) is the highest discharge rate observed when carbon black is free of any scattering.
*1: This means the screw parts fitted to the barrel zone 24.
—*: Although there was not observed any scattering of carbon black, the mixture exhibited extremely high torque and therefore, any conductive resin composition could not be prepared.
**: Both maximum and minimum values were not less than $10^{16}$.

EXAMPLE 3

Desired amounts of carbon black and a thermoplastic resin were charged into a twin-screw extruder according to the charging method B defined in Example 1 and kneaded therein at a cylinder temperature ranging from 180 to 380° C. using the screw parts (at position 5): 4N, followed by cooling the kneaded product and then forming it into cylindrical conductive master batch pellets using a pelletizer. The compositions of the resulting master batch pellets are summarized in the following Tables 4 to 6.

In this Example 3, the carbon black products and the resins used were as follows:

Carbon Black A (CB-A): carbon black having a DBP oil absorption of 480 ml/100 g (Ketjenblack EC600JD available from Ketchen Black International Co., Ltd.)
Carbon Black B (CB-B): carbon black having a DBP oil absorption of 370 ml/100 g (Ketjenblack EC available from Ketchen Black International Co., Ltd.)
polypropylene resin (PP): Sumitomo Noblen AZ-564 available from Sumitomo Chemical Co., Ltd.
polycarbonate resin (PC): Taflon A-2200 available from Idemitsu Petrochemical Co., Ltd.
polyetherimide resin (PEI): Ultem 1010-100 available from Nippon GEP Co., Ltd.

TABLE 4

| Ex. No. | A | B | C | D |
|---|---|---|---|---|
| polypropylene resin (PP) | 92 | 90 | 90 | 85 |
| Carbon Black A | 8 | 10 | — | — |
| Carbon Black B | — | — | 10 | 15 |

TABLE 5

| Ex. No. | E | F | G | H |
|---|---|---|---|---|
| polycarbonate resin (PC) | 92 | 90 | 90 | 85 |
| Carbon Black A | 8 | 10 | — | — |
| Carbon Black B | — | — | 10 | 15 |

TABLE 6

| Ex. No. | I | J | K | L |
|---|---|---|---|---|
| polyetherimide resin (PEI) | 92 | 90 | 90 | 85 |
| Carbon Black A | 8 | 10 | — | — |
| Carbon Black B | — | — | 10 | 15 |

EXAMPLE 4

The PP master batch prepared in Example 3 was mixed with PP resin as a diluent resin in a desired dilution factor. The resulting mixture was fed to a twin-screw extruder whose cylinder was divided into a melting zone, a kneading zone and a die portion, followed by kneading at a screw rotational number of 200 rpm while controlling the temperatures of the melting and kneading zones and the die portion to 250° C., 220° C. and 240° C. respectively. After cooling the kneaded product, it was formed into cylindrical pellets (having a diameter of 2 mm and a length of 3 mm) using a pelletizer. The resulting pellets were fed to an injection molding machine and then molded into an electric conductor having a size of 7.5 cm×7.5 cm×0.3 cm using a desired mold at a cylinder temperature ranging from 180 to 220° C.

In Comparative Examples, master batch Nos. 5 and 6 were diluted in the same manner used above to give electric conductors. As to master batch Nos. 7 and 8, PP and each carbon were blended in a tumbler, then the resulting mixture was fed to a twin-screw extruder and kneaded at a screw rotational number of 200 rpm while controlling the temperatures of the melting and kneading zones and the die portion to 180° C., 210° C. and 180° C. respectively. Thereafter the same procedures used above were repeated to give electric conductors. The compositions and the results of surface resistivity determination of these electric conductors are summarized in the following Table 7.

Incidentally, the surface resistivity which represents the conductivity value was determined according to ASTM D-257.

TABLE 7

| | Present Invention | | | | Comp. Examples | | | |
|---|---|---|---|---|---|---|---|---|
| No. | 1 | 2 | 3 | 4 | 5* | 6* | 7* | 8* |
| PP | 34 | 20 | 34 | 20 | 37.5 | 56 | 94.7 | 88 |
| No. A-MP | 66 | | | | 62.5 | | | |
| No. B-MP | | 80 | | | | | | |
| No. C-MP | | | 66 | | | | | |
| No. D-MP | | | | 80 | | 44 | | |
| CB-A | | | | | | | 5.3 | |
| CB-B | | | | | | | | 12 |
| Carbon Content of Diluent Pellets (%) | 5.3 | 8.0 | 6.6 | 12.0 | 5.0 | 6.6 | — | — |
| Dilution Factor | 1.5 | 1.3 | 1.5 | 1.3 | 1.6 | 2.3 | — | — |
| Surface Resistivity (Ω) | 2.0~ 7.0 × $10^{14}$ | 4.0~ 4.2 × $10^{8}$ | 7.0~ 9.5 × $10^{14}$ | 3.0~ 3.3 × $10^{5}$ | >$10^{16}$ | >$10^{16}$ | 1.5 × $10^{13}$~ 1.0 × $10^{15}$ | 2.5 × $10^{3}$~ 7.1 × $10^{8}$ |

In Table 7, No. A-MP to No. D-MP represent conductive carbon black master batch pellets shown in Table 4, respectively.

As seen from the data listed in Table 7, excellent conductivity (surface resistivity value) can be obtained even in a region where the carbon content observed after dilution is low, according to the present invention wherein each master batch having a specific carbon black concentration was diluted with PP resin at a low dilution factor, i.e., at a dilution factor ranging from 1.01 to 1.5 time. Contrary to this, the conductivity of the composition is suddenly impaired as the carbon content achieved after dilution is reduced in Comparative Examples (Ex. Nos. 5 and 6) in which the dilution factor is not less than 1.6 time. Moreover, in Ex. Nos. 7 and 8 wherein the kneading was carried out at a time without carrying out any dilution, the surface resistivities of the resulting electric conductor show a large deviation and cannot be practically used. As has been discussed above, the present invention permits the production of a compound showing stable conductivity even in the high resistance region ($10^6$ to $10^{16}$ Ω) in which the control of the conductivity is very difficult.

EXAMPLE 5

The PC master batch prepared in Example 3 was mixed with PC resin as a diluent resin in a desired dilution factor. The resulting mixture was fed to a twin-screw extruder whose cylinder was divided into a melting zone, a kneading zone and a die portion, followed by kneading at a screw rotational number of 200 rpm while controlling the temperatures of the melting and kneading zones and the die portion to 330° C., 280° C. and 290° C. respectively. After cooling the kneaded product, it was formed into cylindrical pellets (having a diameter of 2 mm and a length of 3 mm) using a pelletizer. The resulting pellets were fed to an injection molding machine and then molded into an electric conductor having a size of 7.5 cm×7.5 cm×0.3 cm using a desired mold at a cylinder temperature ranging from 280 to 300° C.

In Comparative Examples, master batch Nos. 17 and 18 were diluted in the same manner used above to give electric conductors. As to master batch Nos. 19 and 20, PC and each carbon black product were blended in a tumbler, then the resulting mixture was fed to a twin-screw extruder and kneaded at a screw rotational number of 200 rpm while controlling the temperatures of the melting and kneading zones and the die portion to 280° C., 320° C. and 290° C. respectively. Thereafter the same procedures used above were repeated to give electric conductors. The compositions and the results of surface resistivity determination of these electric conductors are summarized in the following Table 8.

Incidentally, the surface resistivity which represents the conductivity value was determined according to ASTM D-257.

TABLE 8

| Ex. No. | Master Batch Pellet No. | | | | | | |
| --- | --- | --- | --- | --- | --- | --- | --- |
|  | PC | E | F | G | H | CB-A | CB-B |
| Present Invention | | | | | | | |
| 9 | 34 | 66 | | | | | |
| 10 | 20 | 80 | | | | | |
| 11 | 10 | 90 | | | | | |
| 12 | 20 | | 80 | | | | |
| 13 | 20 | | | 80 | | | |
| 14 | 34 | | | | 66 | | |
| 15 | 20 | | | | 80 | | |
| 16 | 0 | | | | 90 | | |
| Comp. Example | | | | | | | |
| 17* | 37.5 | 62.5 | | | | | |
| 18* | 47 | | | 53 | | | |
| 19* | 94.7 | | | | | 5.3 | |
| 20* | 88 | | | | | | 13.5 |

| Ex. No. | Carbon Content of Diluent Pellet (%) | Dilution Factor | Surface Resistivity |
| --- | --- | --- | --- |
| Present Invention | | | |
| 9 | 5.3 | 1.5 | 1.0~8.5 × $10^{15}$ |
| 10 | 6.4 | 1.3 | 2.0~5.1 × $10^{14}$ |
| 11 | 7.2 | 1.1 | 6.0~7.0 × $10^{11}$ |
| 12 | 8.0 | 1.3 | 5.5~6.0 × $10^8$ |
| 13 | 8.0 | 1.3 | 3.0~4.5 × $10^{12}$ |
| 14 | 9.9 | 1.5 | 1.0~7.1 × $10^7$ |
| 15 | 12.0 | 1.3 | 6.5~6.7 × $10^5$ |
| 16 | 13.5 | 1.1 | 1.5~1.9 × $10^3$ |
| Comp. Example | | | |
| 17* | 5.0 | 1.6 | >$10^{16}$ |
| 18* | 8.0 | 1.9 | >$10^{16}$ |
| 19* | — | — | 5.5 × $10^{13}$~1.0 × $10^{15}$ |
| 20* | — | — | 2.5 × $10^3$~7.1 × $10^6$ |

In Table 8, No. E to H represent conductive carbon black master batch pellets shown in Table 5, respectively.

As seen from the data listed in Table 8, excellent conductivity (surface resistivity value) can be obtained even in a region where the carbon content observed after dilution is low, according to the present invention wherein each master batch having a specific carbon black concentration is diluted with PC resin at a low dilution factor, i.e., at a dilution factor ranging from 1.01 to 1.5 time. Contrary to this, the conductivity of the composition is suddenly reduced as the carbon content after dilution is reduced in Comparative Examples (Ex. Nos. 17 and 18) in which the dilution factor is not less than 1.6 time. Moreover, in Ex. Nos. 19 and 20 wherein the kneading was carried out at a time without carrying out any dilution, the surface resistivities of the resulting electric conductor show a large deviation and are not practically acceptable. As has been discussed above, the present invention permits the production of a compound showing stable conductivity even in the high resistance region ($10^6$ to $10^{16}$ Ω) in which the control of the conductivity is very difficult.

EXAMPLE 6

The PEI master batch prepared in Example 3 was mixed with PEI resin as a diluent resin in a desired dilution factor. The resulting mixture was fed to a twin-screw extruder whose cylinder was divided into a melting zone, a kneading zone and a die portion, followed by kneading at a screw rotational number of 200 rpm while controlling the temperatures of the melting and kneading zones and the die portion to 330° C., 350° C. and 380° C. respectively. After cooling the kneaded product, it was formed into cylindrical pellets (having a diameter of 2 mm and a length of 3 mm) using a pelletizer. The resulting pellets were fed to an injection molding machine and then molded into an electric conductor having a size of 7.5 cm×7.5 cm×0.3 cm using a desired mold at a cylinder temperature ranging from 380 to 400° C.

In Comparative Examples, master batch Nos. 29 and 30 were diluted in the same manner used above to give electric conductors. As to master batch Nos. 31 and 32, PEI and each carbon black product were blended in a tumbler, then the resulting mixture was fed to a twin-screw extruder and kneaded at a screw rotational number of 200 rpm while controlling the temperatures of the melting and kneading zones and the die portion to 340° C., 360° C. and 350° C. respectively. Thereafter the same procedures used above were repeated to give electric conductors. The compositions and the results of surface resistivity determination of these electric conductors are summarized in the following Table 9.

Incidentally, the surface resistivity which represents the conductivity value was determined according to ASTM D-257.

TABLE 9

| | Present Invention | | | | | | | |
|---|---|---|---|---|---|---|---|---|
| No. | 21 | 22 | 23 | 24 | 25 | 26 | 27 | 28 |
| PEI | 34 | 20 | 10 | 20 | 20 | 34 | 20 | 10 |
| No. I-MP | 66 | 80 | 90 | | | | | |
| No. J-MP | | | | 80 | | | | |
| No. K-MP | | | | | 80 | | | |
| No. L-MP | | | | | | 66 | 80 | 90 |
| CB-A | | | | | | | | |
| CB-B | | | | | | | | |
| Carbon Content of Diluent Pellets (%) | 5.3 | 6.4 | 7.2 | 8.0 | 8.0 | 9.9 | 12.0 | 13.5 |
| Dilution Factor | 1.5 | 1.3 | 1.1 | 1.3 | 1.3 | 1.5 | 1.3 | 1.1 |
| Surface Resistivity (Ω) | 6.0~ 8.9 × $10^{14}$ | 5.0~ 8.5 × $10^{13}$ | 1.5~ 3.1 × $10^{11}$ | 2.0~ 3.5 × $10^{9}$ | 4.0~ 6.0 × $10^{12}$ | 6.0~ 6.8 × $10^{7}$ | 7.5~ 7.9 × $10^{5}$ | 5.5~ 5.7 × $10^{3}$ |

| | Comparative Example | | | |
|---|---|---|---|---|
| No. | 29* | 30* | 31* | 32* |
| PEI | 37.5 | 56 | 92 | 92 |
| No. I-MP | 62.5 | | | |
| No. J-MP | | | | |
| No. K-MP | | | | |
| No. L-MP | | 44 | | |
| CB-A | | | 8 | |
| CB-B | | | | 8 |
| Carbon Content of Diluent Pellets(%) | 5.0 | 6.6 | — | — |
| Dilution Factor | 1.6 | 2.3 | — | — |
| Surface Resistivity (Ω) | >$10^{16}$ | >$10^{16}$ | 1.0 × $10^{7}$~ 2.1 × $10^{10}$ | 3.5 × $10^{11}$~ 4.1 × $10^{13}$ |

In Table 9, No. I-MP to No. L-MP represent conductive carbon black master batch pellets shown in Table 6, respectively.

As seen from the data listed in Table 9, excellent conductivity (surface resistivity value) can be obtained even in a region where the carbon content after dilution is low, according to the present invention wherein each master batch having a specific carbon black concentration was diluted with PEI resin at a low dilution factor, i.e., at a dilution factor ranging from 1.01 to 1.5 time. Contrary to this, the conductivity of the composition is suddenly dropped as the carbon content observed after dilution is reduced in Comparative Examples (Ex. Nos. 29 and 30) in which the dilution factors were not less than 1.6 time. Moreover, in Ex. Nos. 31 and 32 wherein the kneading was carried out at a time without carrying out any dilution, the surface resistivities of the resulting electric conductor show a large deviation and are not practically acceptable. As has been discussed above, the present invention permits the production of a compound showing stable conductivity even in the high resistance region ($10^{6}$ to $10^{16}$ Ω) in which the control of the conductivity is very difficult.

EXAMPLE 7

Desired amounts of carbon black, graphite and a thermoplastic resin were charged into a twin-screw extruder according to the charging method B defined in Example 1 and kneaded therein at a screw rotational number of 200 rpm and a cylinder temperature ranging from 280 to 380° C. using the screw parts (at position 5): 4N, followed by cooling the kneaded product and then forming it into cylindrical conductive master batch pellets using a pelletizer. In this respect, the graphite was injected into the extruder by the same method used for injecting the carbon black. The compositions of the resulting master batch pellets are summarized in the following Table 10. In this Example, the carbon black products and the resins used are as follows:

Carbon Black B (CB-B): Carbon black having a DBP oil absorption of 370 ml/100 g graphite: artificial graphite GX-6 available from Chuetsu Graphite Co., Ltd.; shape: flake; average particle size: 6 μm polyetherimide resin (PEI): Ultem 1010-100 available from Nippon GEP Co., Ltd.

polybutylene terephthalate resin (PBT): Toray PBT1401×04 available from Toray Industries, Inc.

Modified polyphenylene ether resin (MPPE): Noryl 115 available from Nippon GEP Co., Ltd.

polyethersulfone resin (PES): UDEL P-1700 available from Acomo Japan Ltd.

polyether ether ketone resin (PEEK): VICTREX PEEK 150G, available from ICI Japan Co., Ltd.

TABLE 10

| No. | M | N | O | P | Q | R |
|---|---|---|---|---|---|---|
| CB-B | 7 | 8.4 | 5 | 7 | 7 | 7 |
| graphite | 3 | 3.6 | 5 | 3 | 3 | 3 |
| PEI | 90 | 88 | 0 | 0 | 0 | 0 |
| PBT | 0 | 0 | 90 | 0 | 0 | 0 |
| MPPE | 0 | 0 | 0 | 90 | 0 | 0 |
| PES | 0 | 0 | 0 | 0 | 90 | 0 |
| PEEK | 0 | 0 | 0 | 0 | 0 | 90 |

EXAMPLE 8

The master batch pellets prepared in Example 7, a diluent resin and glass fibers were fed to a twin-screw extruder in each corresponding composition specified in the following Table 11 and then kneaded at a cylinder temperature ranging from 280 to 380° C. and a screw rotational number of 200 rpm. After cooling the kneaded product, it was formed into cylindrical pellets using a pelletizer. The resulting pellets were fed to an injection molding machine and then molded into an electric conductor having a size of 7.5 cm×7.5 cm×0.3 cm using a desired mold at a cylinder temperature ranging from 280 to 400° C. Thereafter the surface resistivity thereof was determined. The compositions and the surface resistivities of these electric conductors are listed in the following Table 11.

In this Example, the glass fibers used were as follows:
Glass Fibers: CS03MA416 available from Asahi Fiber Glass Co., Ltd.

TABLE 11

| No. | 33 | 34 | 35 | 36 | 37 | 38 | 39 |
|---|---|---|---|---|---|---|---|
| No. M-MP | 85 | 0 | 0 | 0 | 0 | 0 | 75 |
| No. N-MP | 0 | 70 | 0 | 0 | 0 | 0 | 0 |
| No. O-MP | 0 | 0 | 60 | 0 | 0 | 0 | 0 |
| No. P-MP | 0 | 0 | 0 | 80 | 0 | 0 | 0 |
| No. Q-MP | 0 | 0 | 0 | 0 | 70 | 0 | 0 |
| No. R-MP | 0 | 0 | 0 | 0 | 0 | 70 | 0 |
| PEI | 5 | 20 | 0 | 0 | 0 | 0 | 15 |
| PBT | 0 | 0 | 10 | 0 | 0 | 0 | 0 |
| MPPE | 0 | 0 | 0 | 20 | 0 | 0 | 0 |
| PES | 0 | 0 | 0 | 0 | 10 | 0 | 0 |
| PEEK | 0 | 0 | 0 | 0 | 0 | 10 | 0 |
| Glass Fiber | 10 | 10 | 30 | 0 | 20 | 20 | 10 |
| Dilution Factor | 1.06 | 1.29 | 1.17 | 1.25 | 1.14 | 1.14 | 1.20 |
| Surface Resistivity | $1.1 \sim 1.5 \times 10^{13}$ | $1.7 \sim 3.0 \times 10^{13}$ | $1.8 \sim 3.5 \times 10^{15}$ | $5.6 \sim 8.2 \times 10^{14}$ | $1.2 \sim 3.0 \times 10^{15}$ | $1.8 \sim 4.8 \times 10^{15}$ | $1.5 \sim 3.5 \times 10^{15}$ |

In Table 11, No. M-MP to No. R-MP represent conductive carbon black master batch pellets shown in Table 10, respectively.

What is claimed is:

1. A method for preparing a conductive carbon black-containing electric conductor comprising the steps of:

kneading (a) conductive resin master batch pellets of conductive carbon black and a thermoplastic resin in which the conductive carbon black accounts for 5 to 50% by weight relative to the total amount 100 parts by weight of the conductive carbon black and the thermoplastic resin, and (b) a thermoplastic resin in a weight ratio: (a+b)/(a) ranging from 1.01 to 1.5 and then extrusion-molding the resulting kneaded product.

2. The method of claim 1 wherein the kneading step is followed by a step of preparing conductive resin pellets, and then extrusion molding the conductive resin pellets.

3. The method of claim 2 wherein in the kneading step, (a) the conductive resin master batch pellets and (b) the thermoplastic resin are kneaded with an inorganic filler, followed by a step of preparing conductive resin pellets, and then extrusion molding the conductive resin pellets.

4. The method of claim 2 wherein in the kneading step, (a) the conductive resin master batch pellets and (b) the thermoplastic resin are kneaded with an inorganic filler, the kneading step being carried out at a temperature ranging from 150 to 380° C. for 5 to 30 minutes when the kneading device is a mixer, or 20 seconds to one minute when the device is an extruder.

5. The method of claim 4 wherein the inorganic filler is used in an amount ranging from 7 to 50 parts by weight per 100 parts by weight of the sum of the conductive resin master batch pellets and the thermoplastic resin.

6. The method of claim 2 wherein the kneading is carried out in a twin-screw extruder to give conductive resin pellets, and then the conductive resin pellets are injection molded.

* * * * *